(12) United States Patent
Carlson

(10) Patent No.: US 6,308,813 B1
(45) Date of Patent: Oct. 30, 2001

(54) FLUID CONTROLLED INTERLOCK MECHANISM AND METHOD

(75) Inventor: J. David Carlson, Cary, NC (US)

(73) Assignee: Lord Corporation, Cary, NC (US)

(*) Notice: Subject to any disclaimer, the term of this patent is extended or adjusted under 35 U.S.C. 154(b) by 0 days.

(21) Appl. No.: 09/667,115

(22) Filed: Sep. 20, 2000

(51) Int. Cl.$^7$ ................................................. F16F 9/12
(52) U.S. Cl. ..................................... 192/220.3; 188/267.1
(58) Field of Search ................................... 188/266, 267, 188/267.1; 192/4 A, 220.3; 70/248, 254

(56) References Cited

U.S. PATENT DOCUMENTS

| | | |
|---|---|---|
| 2,820,471 | 1/1958 | Crowell . |
| 2,940,749 | 6/1960 | Kemelhor . |
| 4,097,833 * | 6/1978 | Myers ................................ 335/261 |
| 4,241,814 * | 12/1980 | Masclet ............................. 188/266 |
| 4,729,459 * | 3/1988 | Inagaki et al. .................... 188/299 |
| 4,887,702 * | 12/1989 | Ratke ................................. 192/4 A |
| 4,986,689 | 1/1991 | Drutchas . |
| 5,058,462 * | 10/1991 | Killiany et al. ..................... 74/878 |
| 5,078,242 * | 1/1992 | Ratke et al. ....................... 192/4 A |
| 5,161,653 * | 11/1992 | Hare, Sr. ........................... 188/267 |
| 5,275,065 * | 1/1994 | Ruiter .............................. 74/483 R |
| 5,277,281 | 1/1994 | Carlson et al. . |
| 5,284,330 | 2/1994 | Carlson et al. . |
| 5,396,973 | 3/1995 | Schwemmer et al. . |
| 5,492,312 | 2/1996 | Carlson . |
| 5,848,678 | 12/1998 | Johnston et al. . |
| 5,862,899 * | 1/1999 | Dahlstrom ......................... 192/4 A |
| 5,954,179 * | 9/1999 | Osborn .......................... 192/219.5 |
| 5,956,951 * | 9/1999 | O'Callaghan ....................... 60/326 |
| 6,017,326 * | 1/2000 | Pasqualucci et al. ............. 604/153 |
| 6,019,201 * | 2/2000 | Gordaninejad et al. ........ 188/267.1 |
| 6,056,572 * | 5/2000 | Schober et al. .................. 188/267 |
| 6,092,976 * | 7/2000 | Kamiya ............................. 414/636 |
| 6,158,470 * | 12/2000 | Ivers et al. ........................ 137/807 |
| 6,220,567 * | 4/2001 | Buelow .............................. 251/90 |

* cited by examiner

Primary Examiner—Robert J Oberleitner
Assistant Examiner—Benjamin A. Pezzlo
(74) Attorney, Agent, or Firm—Michael M. Gnibus

(57) ABSTRACT

An interlock mechanism is provided which includes a controllable fluid within a hydraulic link. The controllable fluid, preferably comprising a magnetorheological fluid, is disposed within the interlock mechanism. The viscosity of the fluid can be changed to allow the interlock mechanism to be actuated. A fluid control means, such as a magnet assembly, is used to control the fluid.

25 Claims, 4 Drawing Sheets

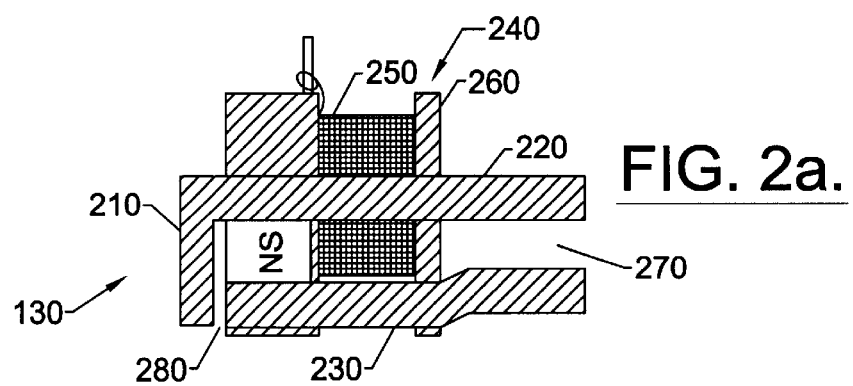
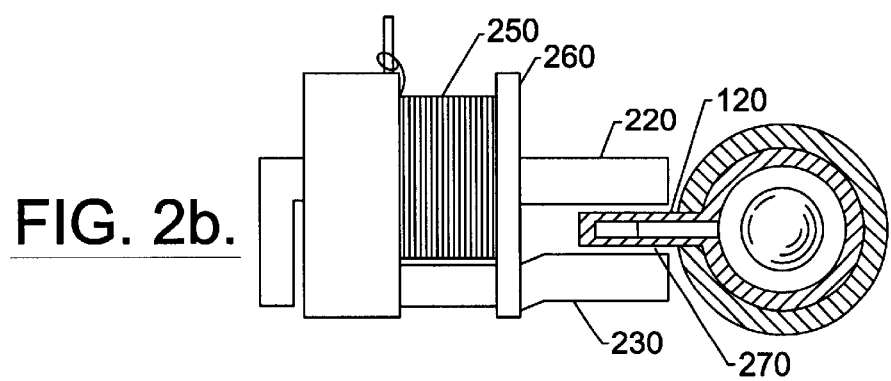
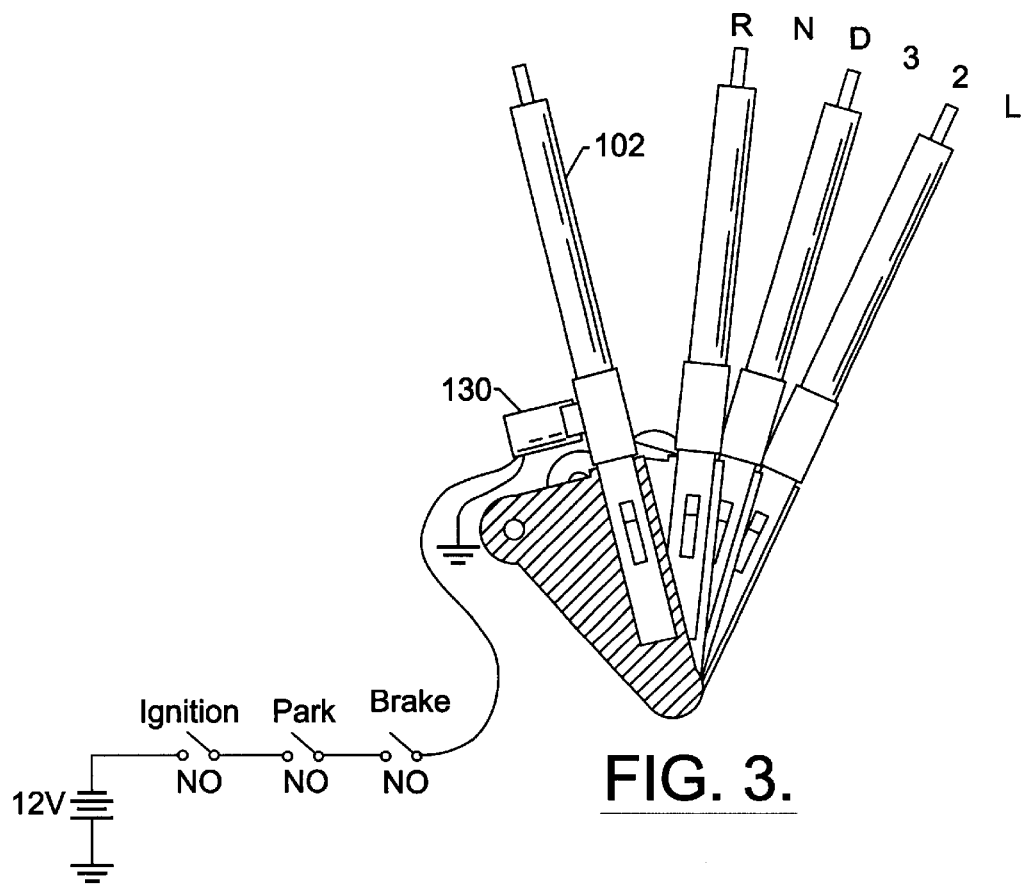

FLUID CONTROLLED INTERLOCK MECHANISM AND METHOD

BACKGROUND

The present invention relates to controllable fluids used to control interlock mechanisms and more particularly to such mechanisms wherein the controllable fluid comprises a magnetorheological fluid.

A great variety of mechanical systems are controlled by cables, push rods, or other elongated force-transmitting members. Control systems of this type are widely employed, especially in vehicular and industrial applications. Such applications include machine tools, manufacturing equipment, and materials handling systems. For reasons of safety and/or process control, it is often desirable to lock out or otherwise immobilize such control systems and thereby prevent the operation of the controlled mechanical system.

An exemplary application is the brake transmission safety interlock (BTSI) system utilized in automobiles. A BTSI system operates to prevent a vehicle's transmission from being taken out of the "park" position if the braking system is not activated. In a typical BTSI system, the shift linkage has a cable-activated locking latch. This latch must be released, typically by activating a button associated with the shifter and communicating with the latch by a cable or push rod, before the transmission may be shifted out of the "park" position. BTSI systems further include some type of immobilizing device associated with the cable and communicating with the brake system. If the brake system is not activated, then the immobilizing device prevents movement of the cable and release of the latch.

A solenoid may be used to control the mechanical linkage, as in U.S. Pat. No. 4,887,702, which describes a typical latch mechanism as well as a particular solenoid controlled BTSI system. In this system, the latch release cable is associated with the plunger of a solenoid and activation of the solenoid draws the plunger and cable into the solenoid coil, thereby preventing further motion of the cable. In its inactive state, the plunger and cable are free to move back and forth. The solenoid and other components each present a potential failure point in the system. In addition, a system with several components bears a higher production cost.

Accordingly, there is a need in the art for improved interlock mechanisms and, more particularly, for interlock mechanisms that require fewer moving parts.

SUMMARY

The present invention relates to a magnetorheological fluid controlled interlock mechanism. The interlock mechanism preferably includes a hydraulic link that may be placed in a mechanical linkage or mechanism to prevent actuation unless properly activated with an electrical current. In one aspect, the present invention provides an interlock mechanism for an automotive transmission shift lever system which prevents the shift lever system from being disengaged from the PARK position unless the ignition is ON and the brake pedal is depressed.

Another aspect of the present invention enables a pre-load release function whereby the shifter button may be depressed before the brake pedal is pushed. The interlock mechanism will release once the interlock conditions are met without the user having to release and re-actuate the shifter button. Accordingly, the interlock system can store the shift button energy until all of the interlock conditions are met.

Another aspect of the present invention includes a check valve which prevents the interlock from becoming locked in the open position. The check valve allows the mechanism to re-engage regardless of the state of the interlock logic.

In accordance with the present invention there is an interlock mechanism comprising a first piston at least partially disposed within a first end of a tubular body and a second piston at least partially disposed within a second end of the tubular body, wherein the first piston and the second piston define a chamber within the tubular body. A valve is disposed within the tubular body dividing the chamber into a first chamber portion and a second chamber portion. The valve prevents a controllable fluid from flowing from the first chamber portion to the second chamber portion. A bypass channel provides a path for the controllable fluid to flow between the first chamber portion and the second chamber portion.

In accordance with another embodiment of the present invention there is an interlock system comprising a plunger at least partially disposed within one end of a tubular body. A first piston is axially oriented within the tubular body and means for translating an axial force are located between the plunger and the first piston. A second piston is also axially oriented within the tubular body. A valve is disposed within the tubular body and defines a first chamber between the first piston and a first end of the valve and a second chamber between the second end of the valve and the second piston. The valve prevents a controllable fluid from flowing from the first chamber to the second chamber. A bypass channel provides a path for the controllable fluid to flow between the first chamber and the second chamber, thereby bypassing the valve. In addition, a fluid control means is in proximity to the bypass channel.

In accordance with another embodiment of the present invention there is an interlock system comprising a plunger at least partially disposed within one end of a tubular body and a first piston axially oriented within the tubular body. The first piston is at least partially covered with a porous material coated with a controllable fluid. A compression spring is axially oriented within the tubular body with a first end of the compression spring engaging an end of the plunger. A second end of the compression spring engages a first end of the first piston. A fluid control means is disposed within the first piston.

In accordance with another aspect of the present invention there is an apparatus for selectively translating axial motion comprising a housing defining a channel having at least a first end and a second end. A first piston assembly is at least partially disposed within the first end of the channel and slidably movable along a first axis. A second piston assembly is at least partially disposed within the second end of the channel and slidably movable along a second axis. A valve assembly is disposed within the channel and defines a first reservoir and a second reservoir. A first fluid communication path flow connects the first reservoir and the second reservoir. In addition, a second fluid communication path flow connects the first reservoir and the second reservoir. A controllable fluid is disposed within at least the first reservoir. In addition, there is an assembly for selectively applying a field to the second communication path to change the viscosity of the controllable fluid in the second fluid communication path.

In accordance with another aspect of the present invention, there is a method of manufacturing an assembly for selectively translating axial motion. The assembly comprises a housing having a channel extending therethrough.

The channel has a valve assembly disposed within the channel dividing the channel into a first chamber portion and a second chamber portion. At least a first fluid path connects the first chamber portion to the second chamber portion. A method of manufacturing the assembly comprises the steps of disposing a first piston assembly at least partially within the first chamber portion; disposing a second piston assembly at least partially within the second chamber portion; and disposing a controllable fluid within at least the first chamber portion.

The foregoing and other aspects will become apparent from the following detailed description of the invention when considered in conjunction with the accompanying drawing figures.

BRIEF DESCRIPTION OF THE DRAWINGS

These and other objects, features, and advantages of the present invention will become more apparent upon reading the following detailed description, taken in conjunction with the accompanying drawings, wherein:

FIGS. 2a and 2b are sectional views of an external magnet assembly for use with the MR fluid controlled interlock mechanism of FIG. 1;

FIG. 3 is a schematic view of a MR fluid controlled interlock system;

DETAILED DESCRIPTION

Figure 1:
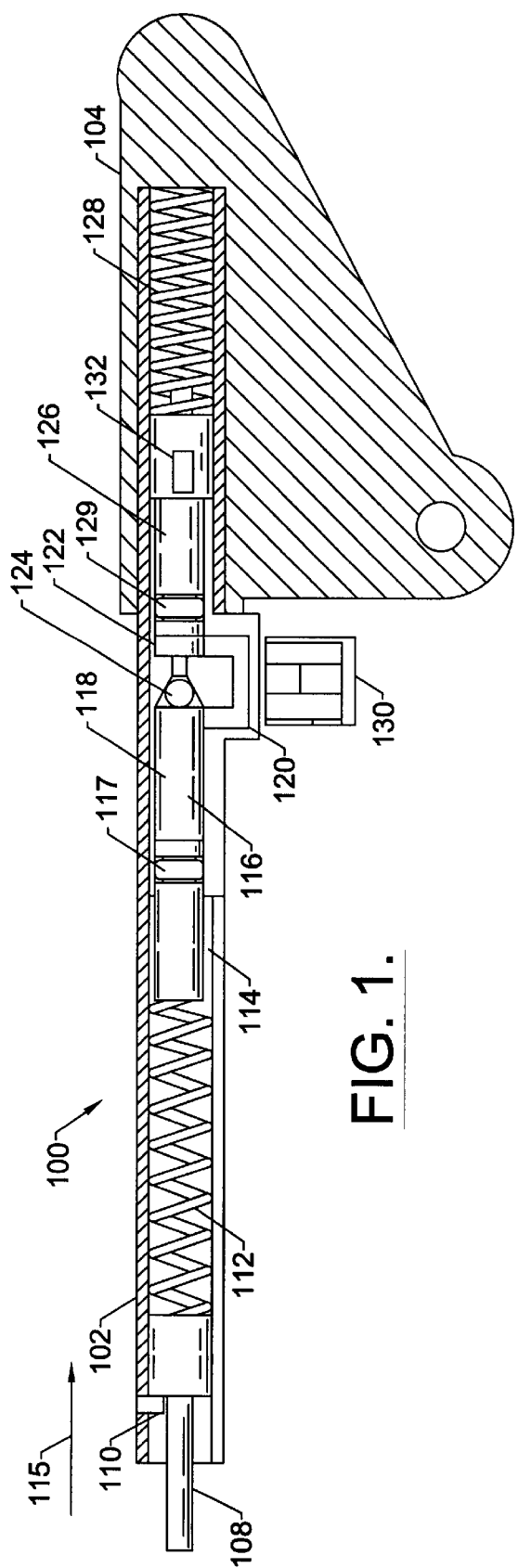
FIG. 1 is a longitudinal sectional view of a MR fluid controlled interlock mechanism.

Now turning to the drawing Figures wherein like elements are referred to by the same reference numbers in all the views, a first embodiment interlock mechanism is illustrated in FIGS. 1–5. FIG. 1 shows an interlock mechanism 100 constructed in accordance with the present invention. Interlock mechanism 100 may be housed within tubular housing 102. Tubular housing 102 may be affixed to pivot mechanism 104. Tubular housing 102 and pivot mechanism 104 combine to form a shift lever assembly which may be used in an exemplary application of an automobile transmission. It should be understood that although use of the interlock mechanism in an automobile is shown and described, the interlock mechanism of the present invention might be used in any application where axial motion control is required.

Button 108 extends from a first end of tubular housing 102. Button 108 may be held within tubular housing 102 by stop block 110. A first portion of button 108 engages the first portion of first spring 112 within tubular housing 102. The second portion of first spring 112 engages a first end of first piston 114. First spring 112 is preferably a compression spring capable of transmitting axial force from button 108 to first piston 114 without experiencing permanent deformity. An O-ring, gasket, or other suitable seal 117 provides a substantially fluid-tight seal between first piston 114 and the wall of tubular housing 102. A first fluid chamber 116 is created within tubular housing 102, with a segment of the housing defining the longitudinal portion of the fluid chamber, the second end of first piston 114 determining one lateral boundary and a first end of check valve 124 determining the other lateral boundary. Similarly, second fluid chamber 122 is formed between the second end of check valve 124 and a first end of second piston 126. An O-ring, gasket, or other suitable seal 129 provides a substantially fluid-tight seal between second piston 126 and the wall of tubular housing 102. A bypass channel 120 may provide an additional fluid pathway between first fluid chamber 116 and second fluid chamber 122. Second piston 126 may include pawl 132. Second spring 128, like spring 112, engages the second end of second piston 126.

FIG. 1 shows first fluid chamber 116 and second fluid chamber 122 having a substantially collinear orientation. As can be appreciated, the orientation of these chambers is not generally critical to the operation of the invention. Rather, the first fluid chamber 116 and the second fluid chamber 122 can be oriented parallel, perpendicular, or obliquely to each other depending on the requirements of the application.

Preferably, first fluid chamber 116 is filled with a magnetorheological (MR) or other controllable fluid 118. MR fluid compositions undergo a change in viscosity in the response to the application of a magnetic field across the fluid. MR fluids typically include ferromagnetic particles dispersed in a carrier fluid. The particles become polarized in the presence of an applied magnetic field, and organize into chains of particles within the fluid. The particle chains increase the viscosity (flow resistance) of the fluid. The particles return to an unorganized state when the magnetic field is removed, which lowers the viscosity of the fluid. These fluids resemble electrorheological materials, which respond to electric rather than magnetic fields. MR fluids of various formulations are known, with water-based compositions being preferred. Particularly, the aqueous MR fluids described in U.S. Pat. No. 5,670,077 and commonly assigned U.S. patent application Ser. No. 09/340,249 are preferred.

When a force having an axial component in the direction indicated by arrow 115 is applied to button 108, the force is transferred through first spring 112, which urges first piston 114 toward first fluid chamber 116. MR fluid 118 becomes more viscous when exposed to a magnetic field. Accordingly, if MR fluid 118 is in a low viscosity state, then the fluid can flow from first fluid chamber 116, through bypass channel 120, and into second fluid chamber 122. Check valve 124 prevents fluid from flowing directly from first fluid chamber 116 to second fluid chamber 122, but fluid can flow back from second fluid chamber 122 to first fluid chamber 116.

As fluid is displaced into second fluid chamber 122, hydraulic pressure is applied to second piston 126, which, in turn, compresses second spring 128. As second piston 126 moves, pawl 132 may disengage from a suitable mechanical housing and interlock mechanism 100 is released.

When shifter button 108 is released, second spring 128 pushes second piston 126 toward check valve 124. As second piston 128 moves axially toward check valve 124, MR fluid 118 is forced out of second fluid chamber 122, through bypass channel 120 and/or check valve 124, and into first fluid chamber 116. Accordingly, MR fluid 118 in first fluid chamber 116 forces first piston 114 toward shifter button 108, which is pushed toward stop block 110 by first spring 112.

As shown in FIG. 1, bypass channel 120 is in close proximity to magnet assembly 130, the details of which will be described later. Magnet assembly 130 provides a magnetic field, which causes MR fluid 118 to become highly viscous. As a result, when bypass channel 120 is in close proximity to the magnetic field generated by magnet assembly 126, MR fluid 118 in bypass channel 120 becomes highly viscous and cannot flow into second fluid chamber 122. Check valve 124, inhibits fluid 118 from flowing from first fluid chamber 116 to second fluid chamber 122. Accordingly, with bypass channel 120 effectively sealed by the high viscosity MR fluid and the orientation of check valve 124, fluid 118 cannot flow into second fluid chamber 122 and interlock mechanism 100 is not released.

FIG. 2a shows an exemplary embodiment of magnet assembly 130 in greater detail. Permanent magnet 210 is affixed to first metallic pole 220 and second metallic pole 230, as shown. The metallic poles are preferably formed of steel, although any material with adequate magnetic permeability to support a magnetic field of sufficient strength can be used. Electromagnet 240 is formed from wire coil 250 and bobbin 260. Preferably, electromagnet 240 is oriented around first metallic pole 220.

When electromagnet 240 is not energized, the magnetic field generated by permanent magnet 210 primarily flows across primary gap 270 between first metallic pole 220 and second metallic pole 230. When electromagnet 240 is energized, the magnetic field produced disrupts the magnetic field generated by permanent magnet 210. Rather than flowing across primary gap 270, the magnetic current flows across secondary gap 280. Accordingly, electromagnet 240 redirects the magnetic field generated by permanent magnet 210 away from primary gap 270.

As shown in FIG. 2b, bypass channel 120 of interlock mechanism 100 is preferably disposed in primary gap 270. Accordingly, when electromagnet 240 is not energized, the magnetic field from permanent magnet 210 acts upon bypass channel 120. The MR fluid within bypass channel 120, being exposed to the magnetic field, becomes highly viscous and is not able to flow through the channel, which prevents actuation of the interlock assembly. Activating electromagnet 240 disrupts the magnetic field in proximity to bypass channel 120, which enables MR fluid 118 to flow through bypass channel 120. This actuates the interlock assembly and allows the interlock assembly to translate linear motion.

While a preferable construction of the magnet assembly 130 has been described, numerous alternate configurations are considered within the scope of the invention. For example, an electromagnet alone could be used in place of the permanent magnet/electromagnet combination. In such an embodiment, energizing the electromagnet produces a magnetic field and locks the interlocking mechanism.

One application of the interlocking mechanism just described is in an automobile gear shift. As shown in FIG. 3, tubular housing 102, used as a shifter lever, is in close proximity to magnet assembly 130 when the shifter is in the "PARK" position. Magnet assembly 130 is preferably mounted to a fixed point, such as the frame of the automobile. If magnet assembly 130 shown in FIG. 2 is used, the magnetic field produced by the permanent magnet ensures that the interlocking mechanism cannot be disengaged when no electrical power is applied. The application may also require interlock conditions to be met before the shifter lever can be moved. Referring to the schematic circuit in FIG. 3, the BTSI system requires that the ignition is turned on, the shifter is in "PARK," and the brake pedal is depressed. Additional criteria may be substituted or added. For example, deactivation of an automobile security system may be required. If each of these conditions is met, then the corresponding normally-open switch is closed. When all conditions are simultaneously met, all of the switches are closed, current flows through the electromagnet, and the interlock mechanism can be disengaged. Once the shifter lever is moved out of "PARK," the magnetic field produced by the permanent magnet does not effect the MR fluid within the interlock mechanism. Accordingly, the shifter lever can be moved to any of the other lever positions (R, N, D, 3, 2, and L) without regard to the state of the interlock conditions.

An additional feature of the embodiment shown in FIG. 1 is a "pre-load release" function. As previously described, when a magnetic field is applied to interlock mechanism 100, fluid cannot flow through bypass channel 120. Accordingly, when shifter button 108 is depressed, first piston 114 will not move substantially because the fluid in first fluid chamber 116 can not flow to second fluid chamber 122, and the resulting hydraulic pressure acts against the movement of first piston 114. Rather than requiring the operator to release shifter button 108, satisfy the interlock conditions, and again depress shifter button 108, first spring 112 stores the mechanical energy produced by depressing shifter button 108. When the interlock conditions are met, first spring 112 transfers the energy to first piston 114 and the interlock mechanism is actuated as before. One advantage of a pre-load release feature is that it allows the user to satisfy the interlock conditions and depress shifter button 108 in any order, reducing the likelihood that the user will become frustrated by having to follow a sequence of steps in a subjectively unnatural order.

Figure 4A:
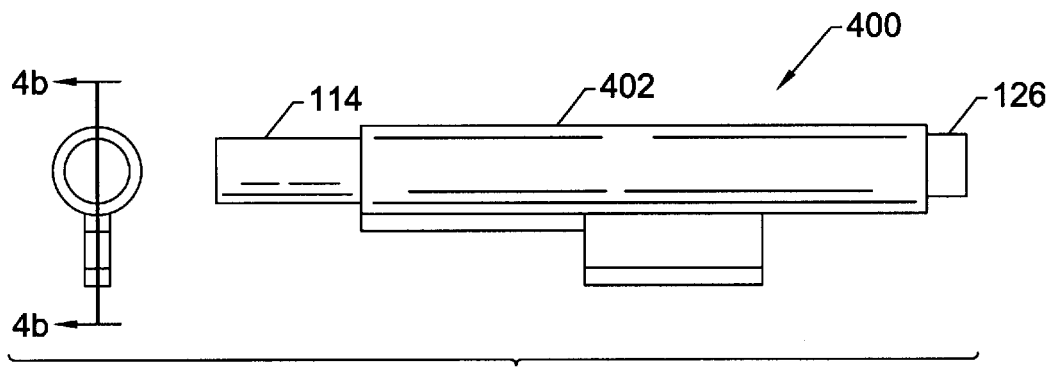
FIGS. 4a and 4b are normal and sectional views, respectively, of a MR fluid controlled interlock cartridge.

FIG. 4 is a side view illustrating an exemplary embodiment of a cartridge for use in an interlock mechanism. Referring to FIG. 4a, interlock cartridge 400 includes a cartridge or plastic housing 402, with a portion of first piston 114 and second piston 126 protruding from either end. Interlock cartridge 400 is particularly suited for retrofitting existing linkage assemblies or for use as a manufacturing component.

Figure 4B:
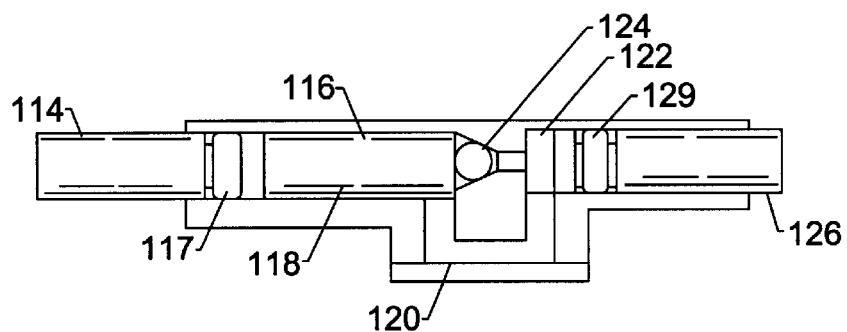

FIG. 4b is a section view of interlock cartridge 400 along line A—A. As can be seen, the arrangement and function of the various components is substantially the same as in FIG. 1. Accordingly, the item numbering used in FIG. 1 has been carried to FIGS. 4a and 4b.

Figure 5:
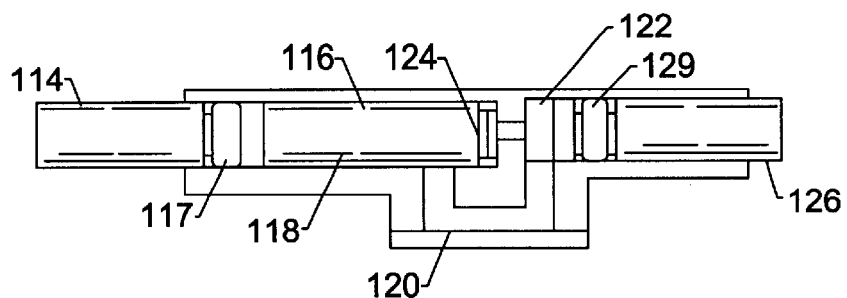
FIG. 5 is a longitudinal sectional view of a MR fluid controlled interlock cartridge with an alternate check valve.

FIG. 5 is a section view of an alternate embodiment of an interlock cartridge having a flap-type check valve rather than the ball-type check valve shown in FIGS. 1 and 4.

Figure 6:
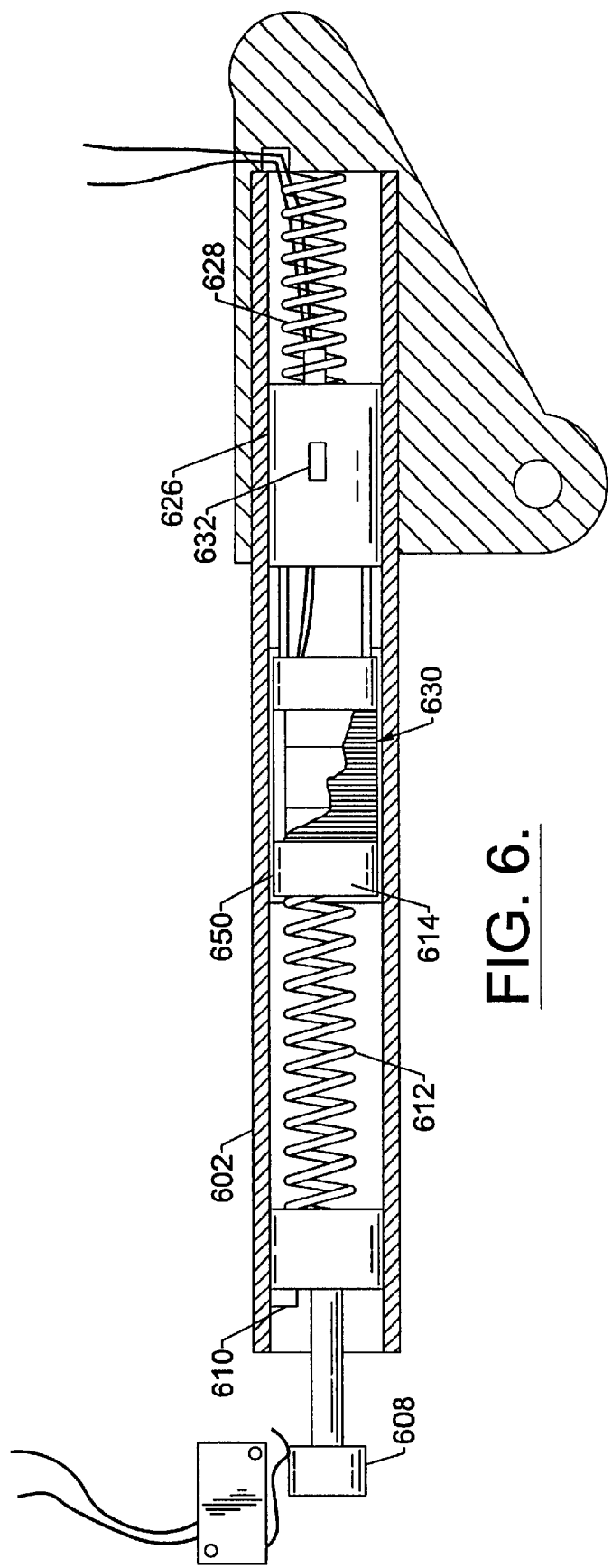
FIG. 6 is a longitudinal sectional view of an alternate embodiment of a MR fluid controlled interlock mechanism.

FIG. 6 is a section view of an alternate embodiment of the interlock mechanism. As in FIG. 1, button 608 extends from the first portion of tubular body 602. Button 608 may be held within tubular housing 602 by stop block 610. The second portion of button 608 engages the first portion of first spring 612 within tubular housing 602. The second portion of first spring 612 engages first piston 614. Here, first piston 614 is covered with MR sponge 650. Preferably, MR sponge 650 may be formed from a porous material coated with MR fluid. As first piston 614 travels though tubular body 602, a coating of MR fluid may be imparted on the inner surface of tubular body 602 and may act as a lubricant.

Magnet assembly 630 is disposed within first piston 614. When magnet assembly 630 produces a magnetic field, the viscosity of the MR fluid in MR sponge 650 and on the adjacent area of the wall of tubular body 602 increases. The increased viscosity impedes the ability of first piston 614 to travel through tubular body 602 and effectively locks first piston 614 in place.

First piston 614 is coupled to second piston 626. While a mechanical connection is shown, the two pistons could be separated by fluid or, alternatively, can be combined into one piston. As second piston 626 moves, pawl 632 disengages from a mechanical housing and interlock mechanism 600 is released.

When shifter button 608 is released, second spring 628 pushes second piston 626 and, indirectly, first piston 614 toward shifter button 608, which is pushed toward stop block 610 by first spring 612.

While the invention has been described in detail and with reference to specific embodiments thereof, it will be apparent to one skilled in the art that various changes and modifications can be made without departing from the spirit and scope thereof. By way of example, the embodiments preferably use magnetorheological fluid, although other controllable fluids are presently known and can be substituted with obvious design modifications, such as replacing the magnet assembly with a suitable fluid control means. In addition, the embodiments illustrate the components arranged in a substantially linear orientation. Those skilled in the art would recognize that the orientation of the components (e.g., having the first piston 114 and the second piston 126 in a non-collinear orientation) does not fundamentally alter the invention. Also, the embodiments illustrate an implementation of a BTSI system. Those skilled in the art would recognize that the invention is not so limited and may be extended to operate with other control systems. These additional embodiments are intended to fall within the scope of the claims which follow.

What is claimed is:

1. An interlock mechanism, comprising:
   a first piston at least partially disposed within a first end of a tubular body;
   a second piston at least partially disposed within a second end of the tubular body, wherein the first piston and the second piston define a chamber within the tubular body;
   a valve disposed within the tubular body dividing the chamber into a first chamber portion and a second chamber portion, wherein the valve prevents a field controllable fluid from flowing from the first chamber portion to the second chamber portion; and
   a bypass channel which provides a path for the field controllable fluid to flow between the first chamber portion and the second chamber portion.

2. An interlock mechanism according to claim 1, wherein the field controllable fluid comprises a magnetorheological fluid.

3. An interlock mechanism according to claim 1, further comprising a fluid control means in proximity to the bypass channel.

4. An interlock mechanism according to claim 3, wherein the field controllable fluid comprises a magnetorheological fluid and the fluid control means comprises a magnet assembly.

5. An interlock mechanism according to claim 1, wherein the valve comprises a check valve.

6. An interlock mechanism according to claim 4, wherein the magnet assembly comprises a permanent magnet and an electromagnet, wherein the electromagnet is oriented to disrupt a portion of a magnetic field produced by the permanent magnet when the electromagnet is activated.

7. An interlock system, comprising:
   a plunger at least partially disposed within one end of a tubular body;
   a first piston axially oriented within the tubular body;
   means for conveying an axially applied force from the plunger to the first piston;
   a second piston axially oriented within the tubular body;
   a valve disposed within the tubular body and defining a first chamber between the first piston and a first end of the valve and a second chamber between the second end of the valve and the second piston, wherein the valve prevents a field controllable fluid from flowing from the first chamber to the second chamber;
   a bypass channel which provides a path for the field controllable fluid to flow between the first chamber and the second chamber, thereby bypassing the valve; and,
   a fluid control means in proximity to the bypass channel.

8. An interlock system according to claim 7, wherein the means for conveying an axial force comprises a compression spring axially oriented within the tubular body, a first end of the compression spring engaging an end of the plunger, and a second end of the compression spring engaging a first end of the first piston.

9. An interlock system according to claim 7, wherein the interlock system comprises a component of an automotive assembly.

10. An interlock system according to claim 7, wherein the valve comprises a check valve.

11. An interlock system according to claim 7, wherein the field controllable fluid comprises a magnetorheological fluid and the fluid control means comprises a magnet assembly.

12. An interlock system according to claim 11, wherein the magnet assembly comprises a permanent magnet and an electromagnet, wherein the electromagnet disrupts a portion of a magnetic field produced by the permanent magnet when the electromagnet is activated.

13. An interlock system according to claim 12, wherein the interlock system comprises a component of an automotive assembly and the electromagnet is activated by a BTSI system.

14. An interlock system comprising:
   a plunger at least partially disposed within one end of a tubular body;
   a first piston axially oriented within the tubular body, the first piston at least partially covered with a porous material coated with a field controllable fluid;
   a compression spring axially oriented within the tubular body, a first end of the compression spring engaging an end of the plunger, a second end of the compression spring engaging a first end of the first piston; and,
   a fluid control means disposed within the first piston.

15. An interlock system according to claim 14, wherein the field controllable fluid comprises a magnetorheological fluid and the fluid control means comprises a magnet assembly.

16. An interlock system according to claim 15, wherein the magnet assembly comprises a permanent magnet and an electromagnet, wherein the electromagnet is oriented to disrupt a portion of a magnetic field produced by the permanent magnet when the electromagnet is activated.

17. An interlock system according to claim 14, wherein the interlock system comprises a component of an automotive assembly and the electromagnet is activated by a BTSI system.

18. An apparatus for selectively conveying axial motion comprising:
   a housing defining a channel having at least a first end and a second end;
   a first piston assembly at least partially disposed within the first end of the channel and slidably movable along a first axis;
   a second piston assembly at least partially disposed within the second end of the channel and slidably movable along a second axis;

a valve assembly disposed within the channel and defining a first reservoir and a second reservoir;

a first fluid communication path between the first reservoir and the second reservoir;

a second fluid communication path between the first reservoir and the second reservoir;

a field controllable fluid disposed within at least the first reservoir; and an assembly for selectively applying a field to the second communication path to change the viscosity of the field controllable fluid in the second fluid communication path.

19. An apparatus for selectively conveying axial motion according to claim 18, wherein the valve assembly comprises a check valve which controls the flow of fluid in the first communication path.

20. An apparatus for selectively conveying axial motion according to claim 18, wherein the field controllable fluid comprises a magnetorheological fluid and the field comprises a magnetic field.

21. An apparatus for selectively conveying axial motion according to claim 20, wherein the assembly comprises a permanent magnet and an electromagnet, wherein the electromagnet is oriented to disrupt a portion of the magnetic field produced by the permanent magnet when the electromagnet is activated.

22. An apparatus for selectively conveying axial motion according to claim 18, wherein the first axis is parallel to the second axis.

23. An apparatus for selectively conveying axial motion according to claim 18, wherein the first axis and the second axis are collinearly oriented.

24. An apparatus for selectively conveying axial motion according to claim 18, wherein the first axis and the second axis are obliquely oriented.

25. An apparatus for selectively conveying axial motion according to claim 18, wherein the first axis is perpendicular to the second axis.

* * * * *